(12) United States Patent
Morishima et al.

(10) Patent No.: US 9,142,831 B2
(45) Date of Patent: Sep. 22, 2015

(54) NONAQUEOUS ELECTROLYTE SECONDARY BATTERY

(71) Applicant: KABUSHIKI KAISHA TOSHIBA, Minato-ku (JP)

(72) Inventors: Hideaki Morishima, Kashiwazaki (JP); Takashi Kobayashi, Kashiwazaki (JP); Masaomi Nakahata, Kamakura (JP); Kazuhiko Mori, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 176 days.

(21) Appl. No.: 13/974,436

(22) Filed: Aug. 23, 2013

(65) Prior Publication Data
US 2013/0344374 A1 Dec. 26, 2013

Related U.S. Application Data

(63) Continuation of application No. PCT/JP2012/053073, filed on Feb. 10, 2012.

(30) Foreign Application Priority Data
Feb. 23, 2011 (JP) .................. 2011-037275

(51) Int. Cl.
*H01M 4/64* (2006.01)
*H01M 4/02* (2006.01)
*H01M 4/04* (2006.01)
(Continued)

(52) U.S. Cl.
CPC ............ *H01M 4/131* (2013.01); *H01M 4/13* (2013.01); *H01M 10/0525* (2013.01); *H01M 10/0587* (2013.01); *H01M 4/485* (2013.01); *H01M 4/525* (2013.01); *H01M 2004/021* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

2007/0231693 A1  10/2007  Inagaki et al.
2013/0074711 A1  3/2013  Uematsu et al.

FOREIGN PATENT DOCUMENTS

CN  1992395  7/2007
CN  101154744  4/2008
(Continued)

OTHER PUBLICATIONS the machine translation of JP 2000-251942, retrieved from <https://www.j-platpat.inpit.go.jp/web/all/top/BTmTopEnglishPage> on Apr. 20, 2015.*

(Continued)

*Primary Examiner* — Cynthia K Walls
(74) *Attorney, Agent, or Firm* — Oblon, McClelland, Maier & Neustadt, L.L.P.

(57) ABSTRACT

According to one embodiment, there is provided a nonaqueous electrolyte secondary battery. A positive electrode current collector comprises a coated portion on which the positive electrode active material layer is provided and a noncoated portion which is adjacent to the coated portion in a direction parallel to the first surface, in which the positive electrode active material layer is not present. A density of the positive electrode active material layer is within a range of 3.1 g/cc to 3.4 g/cc. A ratio W1/W2 of a mass of the coated portion per unit area (W1) to a mass of the noncoated portion per unit area (W2) is from 0.997 to 1.

13 Claims, 2 Drawing Sheets

(51) Int. Cl.
  *H01M 4/131* (2010.01)
  *H01M 4/13* (2010.01)
  *H01M 10/0525* (2010.01)
  *H01M 10/0587* (2010.01)
  *H01M 4/485* (2010.01)
  *H01M 4/525* (2010.01)

(56) References Cited

FOREIGN PATENT DOCUMENTS

| CN | 101847745 | 9/2010 |
|---|---|---|
| EP | 1978579 A2 | 10/2008 |
| JP | 11-185736 | 7/1999 |
| JP | 2000-251942 | 9/2000 |
| JP | 2004-296256 | 10/2004 |
| JP | 2004-335374 | 11/2004 |
| JP | 2005-93236 | 4/2005 |
| JP | 2006-079942 | 3/2006 |
| JP | 2007-273390 | 10/2007 |
| JP | 2010-147030 | 7/2010 |
| JP | 2012-174434 | 9/2012 |

OTHER PUBLICATIONS

Chinese Office Action issued Oct. 27, 2014, in China Patent Application No. 201280003690.5 (with English translation).
U.S. Appl. No. 13/974,601, filed Aug. 23, 2013, Morishima, et al.
U.S. Appl. No. 13/969,047, filed Aug. 16, 2013, Kobayashi, et al.
Office Action mailed on May 19, 2015, in corresponding Chinese application No. 201280003690.5 with English Translation.
International Search Report issued May 1, 2012 in PCT/JP2012/053073 filed Feb. 10, 2012.
European Search Report in application No. 12749975.4, issued Jul. 30, 2015.

\* cited by examiner

NONAQUEOUS ELECTROLYTE SECONDARY BATTERY

CROSS REFERENCE TO RELATED APPLICATIONS

This application is a Continuation application of PCT Application No. PCT/JP2012/053073, filed Feb. 10, 2012 and based upon and claiming the benefit of priority from Japanese Patent Application No. 2011-037275, filed Feb. 23, 2011, the entire contents of all of which are incorporated herein by reference.

FIELD

Embodiments described herein relate generally to a nonaqueous electrolyte secondary battery.

BACKGROUND

In recent years, use of a nonaqueous electrolyte secondary battery as a power source for hybrid electric vehicles or as an electric storage device for power generators using natural energy such as solar light and wind has been studied. A load on a power source for a vehicle is considerably fluctuated depending on a travelling state of the vehicle and the like. A power generation amount of a power generator is considerably fluctuated depending on environmental conditions. Therefore, the nonaqueous electrolyte secondary battery is sometimes required to discharge or store a large current in a short time. Therefore, the nonaqueous electrolyte secondary battery is desired to have an excellent large current property. However, in the case where an internal resistance of the battery is large, there is a problem that performance is deteriorated when charge-discharge is performed at a large current.

CITATION LIST

Patent Literature

Patent Literature 1: Jpn. Pat. Appln. KOKAI Publication No. 2004-296256
Patent Literature 2: Jpn. Pat. Appln. KOKAI Publication No. 2006-79942

DETAILED DESCRIPTION

In general, according to one embodiment, there is provided a nonaqueous electrolyte secondary battery having a small internal resistance and an excellent large current property.

According to the embodiment, there is provided a nonaqueous electrolyte secondary battery comprising a positive electrode, a negative electrode, and a nonaqueous electrolyte. The positive electrode comprises a positive electrode current collector having a first surface and a first positive electrode active material layer provided on a part of the first surface. The negative electrode comprises a negative electrode current collector having a second surface opposed to the first surface and a first negative electrode active material layer provided on a part of the second surface. The positive electrode current collector comprises a first coated portion on which the first positive electrode active material layer is provided and a first noncoated portion which is adjacent to the first coated portion in a direction parallel to the first surface, in which the first positive electrode active material layer is not present. The first noncoated portion is adjacent to at least one edge of the positive electrode current collector and extends along the at least one edge. A length from a boundary between the first coated portion and the first noncoated portion to the at least one edge of the positive electrode current collector is within a range of 5 mm to 20 mm. A density of the first positive electrode active material layer is within a range of 3.1 g/cc to 3.4 g/cc. A ratio W1/W2 of a mass of the first coated portion per unit area (W1) to a mass of the first noncoated portion per unit area (W2) is from 0.997 to 1.

Hereinafter, the embodiments will be described with reference to the drawings.

First Embodiment

Figure 1:
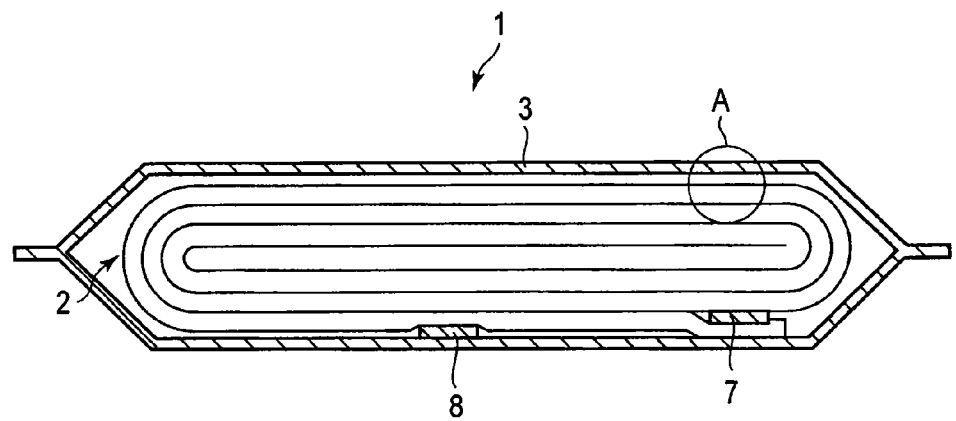
FIG. 1 is a block diagram showing a cross-section of a flat nonaqueous electrolyte battery according to the embodiments.
Figure 2:
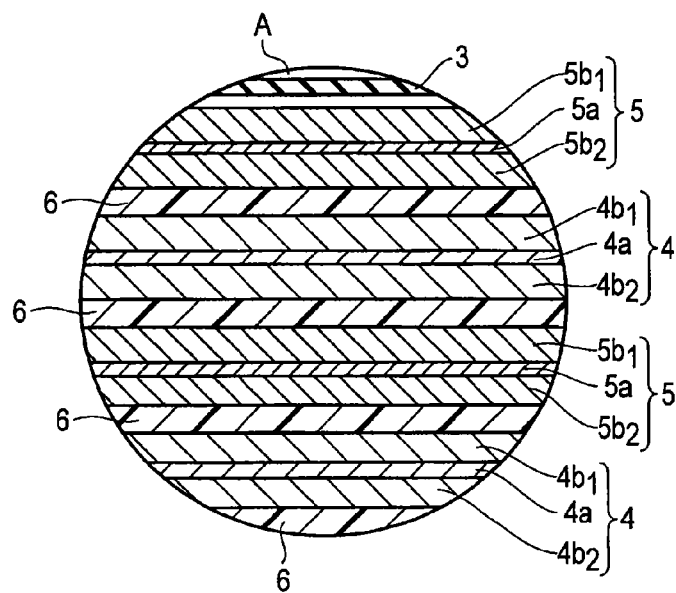
FIG. 2 is an enlarged sectional view showing Part-A of FIG. 1.

FIG. 1 is a block diagram showing a cross-section of a flat nonaqueous electrolyte battery 1. FIG. 2 is an enlarged sectional view showing Part-A of FIG. 1. The nonaqueous electrolyte battery 1 is provided with a wound electrode group 2. The wound electrode group 2 is housed in a container 3. Further, the container 3 is filled with a nonaqueous electrolyte (not shown).

As shown in FIG. 2, the wound electrode group 2 is formed of a positive electrode 4, a negative electrode 5, and a separator 6. The wound electrode 2 is formed by laminating the positive electrode 4 and the negative electrode 5 with the separator 6 being sandwiched therebetween and winding in the form of a flat shape.

As shown in FIG. 1, in the vicinity of an outer peripheral edge of the wound electrode group 2, a positive electrode terminal 7 is electrically connected to the positive electrode 4, and a negative electrode terminal 8 is electrically connected to the negative electrode 5.

A baggy container made from a laminate film is used for the container 3. The electrode group 2 and the nonaqueous electrolyte are tightly sealed within by heat-sealing an opening of the laminate film housing back in a state where the positive electrode terminal 7 and the negative electrode terminal 8 are extended to outside through an opening of the baggy container. The container is not limited to the one made from laminate film, and a metal can, for example, may be used for the container.

<Positive Electrode>

As shown in FIG. 2, the positive electrode 4 is provided with a positive electrode current collector 4a and a positive electrode active material layer 4b. The positive electrode active material layer 4b includes a positive electrode active material and arbitrarily includes a conductive agent and a binder. The positive electrode active material layer 4b is provided on one or both of surfaces of the positive electrode current collector 4a.

Figure 3:
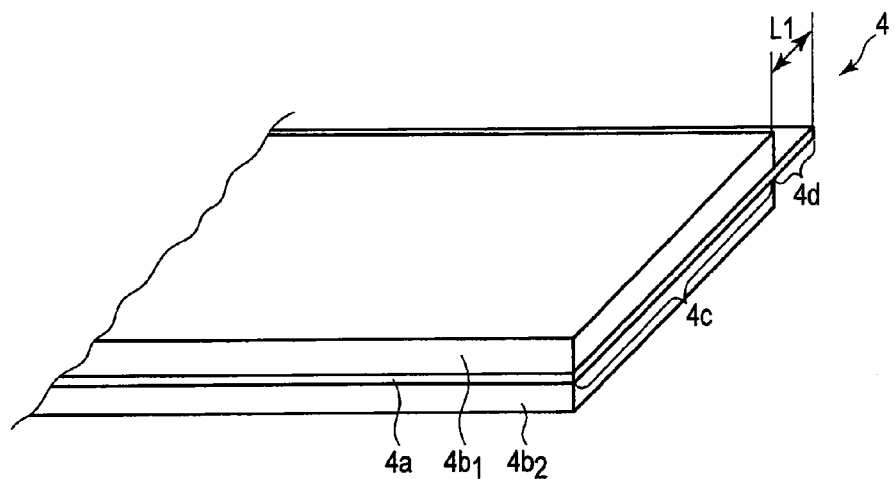
FIG. 3 is a perspective view showing a part of a positive electrode.

FIG. 3 is a perspective view showing one example of the positive electrode. Shown in FIG. 3 is a part of the positive electrode 4 in which the positive electrode active material layer 4b is provided on each of both surfaces of the positive electrode current collector 4a. A first positive electrode active material layer $4b_1$ is provided on a part of a first surface which is one of the surfaces of the positive electrode current collector $4a$. A second positive electrode active material layer $4b_2$ is provided on a part of a surface reverse to the first surface of the positive electrode current collector $4a$.

The positive electrode current collector $4a$ includes a first coated portion $4c$ on which the first positive electrode active material layer $4b_1$ is provided and a first noncoated portion $4d$ which is adjacent to the first coated portion $4c$ in a direction parallel to the first side, in which the first positive electrode active material layer $4b_1$ is not present.

The first noncoated portion $4d$ is adjacent to at least one edge of the positive electrode current collector $4a$ and extends along the at least one edge. The first noncoated portion $4d$ functions as a positive electrode tab. The positive electrode terminal 7 shown in FIG. 1 is connected to the first noncoated portion $4d$ directly or via a conduction member such as a lead. Thus, the positive electrode 4 and the positive electrode terminal 7 are electrically connected to each other.

In the present embodiment, a length from a boundary between the first coated portion $4c$ and the first noncoated portion $4d$ to the edge to which the first noncoated portion $4d$ is adjacent is referred to as L1. L1 is within a range of 5 mm to 20 mm. When L1 is 5 mm or more, it is possible to increase a contact area for the first noncoated portion $4d$ with the positive electrode terminal 7 or the conduction member. Thus, it is possible to reduce a contact resistance between them. As a result, a reduction of internal resistance is enabled. Further, when L1 is 20 mm or less, it is possible to prevent a reduction of energy density. A minimum value of the length from the boundary between the first coated portion $4c$ and the first noncoated portion $4d$ to the edge of the positive electrode current collector is 5 mm or more, and a maximum value of the length is 20 mm or less.

Further, in the present embodiment, a density of the first positive electrode active material layer $4b_1$ is within a range of 3.1 g/cc to 3.4 g/cc. When the density of the first positive electrode active material layer $4b_1$ is within the above range, it is possible to improve physical contact for the positive electrode current collector $4a$ with the positive electrode active material. As a result, it is possible to reduce the internal resistance inside the electrode. Further, a density of the second positive electrode active material layer $4b_2$ is preferably within the above range.

As used herein, the term "density" means a value calculated from a volume and a mass, in which the volume is calculated by measuring a thickness and an area of the positive electrode active material layer. More specifically, the term "density" means a so-called bulk density which is a density in the case where pores including both of apertures communicated with an ambient air and apertures which are not communicated with the ambient air and are independent from one another in the positive electrode active material layer are counted into the calculation.

A ratio W1/W2 of a mass of the first coated portion $4c$ per unit area (W1) to a mass of the first noncoated portion $4d$ per unit area (W2) is from 0.997 to 1. The mass ratio W1/W2 is obtained by measuring a mass per unit area (for example, $g/cm^2$) of each of the first coated portion $4c$ and the first noncoated portion $4d$ and calculating from the results.

The second positive electrode active material layer $4b_2$ is preferably provided only on the first coated portion. More specifically, the first positive electrode active material layer $4b_1$ and the second positive electrode active material layer $4b_2$ are preferably provided at positions where they are opposed to each other with the positive electrode current collector $4a$ being sandwiched therebetween.

As the positive electrode active material contained in the positive electrode active material layer $4b$, a lithium transition metal composite oxide may be used. Examples thereof include $LiCoO_2$, $Li_{1+a}(Mn,Ni,Co)_{1-a}O_2$ ($0.0<a<0.2$), $Li_{1+b}Ni_{1-b-c}M1_cO_2$ ($0.0<b<0.2$, $0.0<c<0.4$, and M1 is at least one element selected from Co, Al, and Fe), $Li_{1+d}Mn_{2-d-e}M2_eO_4$ ($0<d<0.3$, $0<e<0.3$, and M2 is at least one element selected from Mg, Al, Fe, Co, and Ni), $LiM3PO_4$ (M3 is at least one element selected from Fe, Co, and Ni). These composite oxides may be used alone or in combination of a plurality of types thereof.

The conductive agent is used for suppressing a contact resistance between the active material and the current collector. Examples thereof include a carbonaceous material such as acetylene black, carbon black, and graphite.

The binder is used for binding the active material and the conductive agent to each other. Examples thereof include polytetrafluoroethylene (PTFE), polyvinylidene fluoride (PVdF), and a fluorine-based rubber.

A mixing ratio among the positive electrode active material, the conductive agent, and the binder may preferably be such that the positive electrode active material is from 80% by mass to 95% by mass, the conductive agent is from 3% by mass to 18% by mass, and the binder is from 2% by mass to 17% by mass. The above-described effects are attained when the conductive agent is contained in the amount of 3% by mass or more, and it is possible to suppress decomposition of the nonaqueous electrolyte on a conductive agent surface under a high temperature storage when the conductive agent is contained in the amount of 18% by mass or less. It is possible to attain satisfactory electrode strength when the binder is contained in the amount of 2% by mass or more, and it is possible to reduce the internal resistance through a reduction of an amount of an insulator to be mixed when the binder is contained in the amount of 17% by mass or less.

The positive electrode current collector $4a$ may preferably be an aluminium foil or an aluminium alloy foil containing one or more element(s) selected from the group consisting of Mg, Ti, Zn, Mn, Fe, Cu, and Si.

When the mass ratio (W1/W2) is within the above range, it is possible to diminish a difference in mass per unit area between the first coated portion $4c$ and the first noncoated portion $4d$. Accordingly, it is possible to diminish skewness of the electrode. When the skewness of the electrode is small, a gap is hardly formed between the electrodes on the occasion of winding or stacking the electrodes. As a result, it is possible to reduce the electric resistance inside the battery. Thus, it is possible to provide the positive electrode having small internal resistance.

It is possible to provide the nonaqueous electrolyte battery which is excellent in large current property by using the positive electrode having the above-described configuration.

Hereinafter, a positive electrode production method will be described.

To start with, a slurry is prepared by suspending the positive electrode active material, the conductive agent, and the binder into a solvent. As the solvent, N-methylethyl pyrrolidone may be used, for example. A mixing ratio of a total mass of the positive electrode active material, the conductive agent and the binder to a mass of the solvent may preferably be within a range of 50:50 to 80:20.

Next, a positive electrode active material layer is formed by coating the slurry on one or both of surfaces of the positive electrode current collector, followed by drying. The slurry is coated on the positive electrode current collector except for the first noncoated portions which are successively aligned at a constant width. The first noncoated portion is preferably adjacent to an edge which is along a longitudinal direction of the positive electrode current collector. Alternatively, two first noncoated portions may be provided in such a manner that the first noncoated portions respectively are adjacent to both edges which are along the longitudinal direction of the positive electrode current collector. A length of the first noncoated portion is adjusted to be within a range of 5 mm to 20 mm. The length of the first noncoated portion means a length from a boundary between the first coated portion and the first noncoated portion to the edge of the positive electrode current collector to which the first noncoated portion is adjacent. If the positive electrode is used for a wound electrode group, the length means a length which is in a direction perpendicular to the longitudinal direction of the positive electrode.

Next, the positive electrode current collector on which the positive electrode active material layer is formed is rolled in such a manner that a density of the positive electrode active material layer is within a range of 3.1 g/cc to 3.4 g/cc. The rolling may be performed by using a roller press machine.

In the rolling step, the positive electrode current collector is rolled together with the positive electrode active material layer. However, since a diameter of the roller is constant, the roller does not contact the noncoated portion on which the active material layer is not coated. Therefore, the coated portion on which the active material layer is coated is rolled to reduce the mass per unit area (W1), while the first noncoated portion is not rolled to keep the mass per unit area (W2) unchanged. As a result, the mass of the first coated portion per unit area (W1) is smaller than the mass of the first noncoated portion per unit area (W2). More specifically, the mass ratio (W1/W2) is less than 1.0, for example, about 0.995. It is difficult to make the mass ratio (W1/W2) to be 0.997 or more even if the rolling is performed by using a roller having a diameter exceeding 400 mm, for example.

In the case where the mass ratio (W1/W2) is less than 0.997, a stress is generated on a boundary between the first coated portion and the first noncoated portion to cause skewness of the entire electrode. The skewed electrode entails a gap between electrodes when the electrodes are wound or cut and stacked, thereby increasing a gap between electrode plates of the positive electrode and the negative electrode. As a result, an electric resistance inside the battery is increased, thus, a large current property is deteriorated.

However, according to the present embodiment, it is possible to make the mass ratio (W1/W2) to be 0.997 or more by reducing the mass per unit area (W2) by drawing the first noncoated portion. The drawing of the first noncoated portion is realized by performing tension processing on the entire positive electrode. In the tension processing, tension is applied to the entire positive electrode in a direction parallel to the boundary between the first coated portion and the first noncoated portion. The tension processing enables to selectively draw the first noncoated portion.

It is considered that the first noncoated portion is selectively drawn due to concentration of the tension on the first noncoated portion even when the tension is applied evenly onto the entire positive electrode since the first noncoated portion is not rolled while the first coated portion is rolled. For example, an aluminum foil which is ordinarily used for a current collector is drawn when tension which is substantially equivalent to 100 N/mm² is applied in a direction perpendicular to a cross-section. Therefore, tension of about 1500 N/m is required for drawing an aluminum foil having a thickness of 15 μm. However, it is possible to draw the first noncoated portion with tension of about 300 N/m in the tension processing in the present embodiment. This indicates that it is possible to selectively draw the first noncoated portion even when the tension is evenly applied on the entire positive electrode.

Further, according to the present embodiment, it is possible to prevent fracture of the electrode since it is possible to draw the first noncoated portion with the tension of about 300 N/m.

The tension processing may be performed by using a rewinder provided with a withdrawing device and a winding device, for example. It is possible to control tension T to be applied on an electrode by adjusting a brake force of the withdrawing device and a winding force of the winding device. The tension processing is performed by subjecting the electrode after the rolling processing to withdrawing and winding through the rewinder. The tension T may preferably be within a range of 100 N/m to 600 N/m. It is possible to draw the first noncoated portion without fracture of the electrode by applying the tension within the range, thereby making it possible to attain the mass ratio (W1/W2) of 0.997 or more.

The first noncoated portion may be heated when performing the tension processing. Since a stress required for plastic deformation is reduced to be smaller than 100 N/mm² by the heating, it is possible to draw the noncoated portion with smaller tension. A heating temperature is preferably from 60° C. to 140° C. It is possible to attain the above-described effects by heating to 60° C. or more. Further, by heating at 140° C. or less, it is possible to prevent battery property deterioration which can otherwise be caused by alteration of the binder contained in the active material layer by a high temperature. The heating temperature is more preferably from 100° C. to 140° C. Hot air, an infrared ray heater, an electromagnetic induction heater, or the like may be used for the heating. Alternatively, the heating may be performed by bringing the electrode into contact with a heated roller. In the case where the tension processing is performed under heating, the tension T may preferably be within a range of 50 N/m to 400 N/m.

<Negative Electrode>

As shown in FIG. 2, the negative electrode 5 is provided with a negative electrode current collector 5a and a negative electrode active material layer 5b. The negative electrode active material layer 5b includes a negative electrode active material and arbitrarily includes a conductive agent and a binder. The negative electrode active material layer 5b is provided on one or both of surfaces of the negative electrode current collector 5a.

As the negative electrode active material contained in the negative electrode active material layer 5b, a titanium-containing metal composite oxide may be used, for example. Examples thereof include a lithium titanium oxide and a titanium-based oxide. The titanium-based oxide may not preliminarily contain lithium. Such titanium-based oxide can contain lithium when the battery is charged.

Examples of the lithium titanium oxide include $Li_{4+x}Ti_5O_{12}$ ($0 \leq x \leq 3$) having a spinel structure and $Li_{2+y}Ti_3O_7$ ($0 \leq y \leq 3$) having a ramsdellite structure.

Examples of the titanium-based oxide include $TiO_2$ and a metal composite oxide containing at least one element of P, V, Sn, Cu, Ni, Co, and Fe and Ti. As $TiO_2$, those having an anatase structure, subjected to heat treatment at 300° C. to 500° C. in a synthesis process, and having a low crystallinity are preferred.

Examples of the metal composite oxide include $TiO_2$—$P_2O_5$, $TiO_2$—$V_2O_5$, $TiO_2$—$P_2O_5$—$SnO_2$, and $TiO_2$—$P_2O_5$-MeO (Me is at least one element selected from the group consisting of Cu, Ni, Co, and Fe). The metal composite oxide may preferably be those in which a crystal phase and an amorphous phase are coexistent or those having a microstructure in which an amorphous phase solely exists. The metal composite oxide which has the microstructure is capable of largely improving a cycle property.

The negative electrode active material may preferably be selected from the lithium titanium oxides and the metal composite oxides containing at least one element of P, V, Sn, Cu, Ni, Co, and Fe and Ti.

The conductive agent is used for suppressing a contact resistance between the active material and the current collector. Examples thereof include a carbonaceous material such as acetylene black, carbon black, and graphite.

The binder is used for binding the active material and the conductive agent to each other. Examples thereof include polytetrafluoroethylene (PTFE), polyvinylidene fluoride (PVdF), a fluorine-based rubber, and a styrene butadiene rubber.

A mixing ratio among the negative electrode active material, the conductive agent, and the binder may preferably be such that the negative electrode active material is from 70% by mass to 96% by mass, the conductive agent is from 2% by mass to 28% by mass, and the binder is from 2% by mass to 28% by mass. When the conductive agent is contained in the amount of 2% by mass or more, a power collection property of the negative electrode layer is improved, whereby the large current property of the battery is improved. When the binder is contained in the amount of 2% by mass or more, the binding property between the negative electrode layer and the negative electrode current collector is improved, whereby a cycle property is improved. On the other hand, from the viewpoint of attaining a high capacity, each of the conductive agent and the binder may preferably be contained within the range of 28% by mass or less.

The negative electrode current collector $5a$ may preferably be an aluminium foil, an aluminium alloy foil containing one or more element(s) selected from the group consisting of Mg, Ti, Zn, Mn, Fe, Cu, and Si, or a copper foil. The aluminum foil or the above-described aluminium alloy foil is more preferred since they are electrochemically stable in a potential range higher than 1.0 V.

It is possible to produce the negative electrode by preparing a slurry by suspending the negative electrode active material, the conductive agent, and the binder into a widely-used solvent, forming the negative electrode layer by coating and drying the slurry on the negative electrode current collector, and rolling.

As the solvent, N-methylethyl pyrrolidone may be used, for example. A mixing ratio of a total mass of the negative electrode active material, the conductive agent and the binder to a mass of the solvent may preferably be within a range of 50:50 to 80:20.

<Nonaqueous Electrolyte>

As the nonaqueous electrolyte, a liquid nonaqueous electrolyte or a gel nonaqueous electrolyte may be used. It is possible to prepare the liquid nonaqueous electrolyte by dissolving an electrolyte into an organic solvent. It is possible to prepare the gel nonaqueous electrolyte by comprising a liquid electrolyte and a polymer material.

A concentration of the electrolyte in the liquid nonaqueous electrolyte may preferably be within a range of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethasulfonate ($LiCF_3SO_3$), and lithium bistrifluoromethylsulfonylimide [$LiN(CF_3SO_2)_2$] and mixtures thereof. The electrolyte may preferably be hardly-oxidative at a high potential, and $LiPF_6$ is most preferred.

Examples of the organic solvent include a cyclic carbonate such as propylene carbonate (PC), ethylene carbonate (EC), and vinylene carbonate; a chained carbonate such as diethyl carbonate (DEC), dimethyl carbonate (DMC), and methylethyl carbonate (MEC); a cyclic ether such as tetrahydrofuran (THF), 2methyltetrahydrofuran (2MeTHF), and dioxolan (DOX); a chained ether such as dimethoxyethane (DME) and diethoxyethane (DEE); γ-butyrolactone (GBL); acetonitrile (AN); and sulfolane (SL). The organic solvents may be used alone or in the form of a mixed solvent.

Examples of the polymer material include polyvinylidene fluoride (PVdF), polyacrylonitrile (PAN), and polyethylene oxide (PEO).

Alternatively, an ambient temperature molten salt (ionic melt), a polymeric solid electrolyte, an inorganic solid electrolyte, or the like may be used as the nonaqueous electrolyte.

The ambient temperature molten salt means a compound which is capable of existing as a liquid at an ambient temperature (for example, 15° C. to 25° C.) among organic salts formed of a combination between organic cation and anion. The ambient temperature molten salt include those which as a single substance exist as a liquid, those which become a liquid when mixed with an electrolyte, and those which become liquid when dissolved into an organic solvent. In general, a melting point of the ambient temperature molten salt to be used in the nonaqueous electrolyte battery is 25° C. or less. Further, the organic cation has a quaternary ammonium skeleton.

The polymeric solid electrolyte is prepared by dissolving an electrolyte into a polymer material, followed by solidification.

The inorganic solid electrolyte is a solid substance having lithium ion conductivity.

<Separator>

As the separator, for example, a porous film formed from a material such as polyethylene, polypropylene, cellulose, and polyvinylidene fluoride (PVdF), a synthetic resin non-woven cloth, and the like are usable. Among the above, the porous film made from polyethylene or polypropylene is capable of melting at a certain temperature and cutting off a current. Therefore, such porous film is preferred from the viewpoint of safety improvement.

Further, since the porous film formed from cellulose is capable of containing a larger amount of electrolyte as compared to a separator made from a different material and having an identical thickness with the porous film, the porous film has relatively large conductivity for lithium ions in the electrolyte and is suitably used in a high output type nonaqueous electrolyte battery in which a large current is inevitably flown.

<Container>

As the container, a container in the form of a bag or a metal container made from a laminate film is usable. A thickness of the laminate film may preferably be 0.5 mm or less, more preferably 0.2 mm or less. A thickness of the metal container may preferably be 1.0 mm or less, more preferably 0.5 mm or less, and further preferably 0.3 mm or less.

A shape of the container may be a flat shape (thin shape), a square shape, a cylindrical shape, a coin shape, a button shape, or the like. The container may be a container for a small battery which is mounted to a mobile electronic appliance and a container for a large battery which is mounted to a vehicle having 2 to 4 wheels, for example, according to a battery dimension.

As the laminate film, a multilayer film in which a metal layer is inserted between polymer resin layers may be used. The metal layer may preferably be an aluminum foil or an aluminum alloy foil for attaining a light weight. The resin layers are used for reinforcing the metal layer. Examples of the resin include a polymer material such as polypropylene (PP), polyethylene (PE), nylon, and polyethylene terephthalate (PET). The laminate film may be shaped into the shape of the container by sealing by thermal fusion bonding.

The metal container is made from aluminum or an aluminum alloy. The aluminum alloy may preferably be the one containing an element such as magnesium, zinc, silicone, and the like. In the case where a transition metal such as iron, copper, nickel, and chromium is contained in the alloy, content thereof is preferably 1% by mass or less. Thus, it is possible to dramatically improve long term reliability and heat dissipation property under high temperature environment.

<Electrode Group>

As described above, the electrode group is formed of the positive electrode 4, the negative electrode 5, and the separator 6. The separator includes first and second portions which are separated from each other and a third portion which is positioned between the first and second portions. The third portion of the separator is positioned between the first coated portion of the positive electrode and a second coated portion of the negative electrode. The first noncoated portion of the positive electrode may preferably be opposed to the first portion of the separator, and the second noncoated portion of the negative electrode may preferably be opposed to the second portion of the separator. In the case of the wound electrode group, the first noncoated portion of the positive electrode is preferably positioned on a opposite side to a side on which the second noncoated portion of the negative electrode is positioned, in a direction of a winding axis.

According to the above-described embodiment, it is possible to provide the nonaqueous electrolyte battery having small internal resistance and excellent large current property.

Though the nonaqueous electrolyte secondary battery using the wound electrode group is taken as the example in the foregoing embodiment, the embodiment is not limitative, and a laminate electrode group may be used in place of the wound electrode group.

Second Embodiment

A nonaqueous electrolyte battery according to the second embodiment has the same configuration as the first embodiment except for using a negative electrode which is described below.

A negative electrode 5 is provided with a negative electrode current collector 5$a$ and a negative electrode active material layer 5$b$. The negative electrode active material layer 5$b$ includes a negative electrode active material and arbitrarily includes a conductive agent and a binder. The negative electrode active material layer 5$b$ is provided on one or both of surfaces of the negative electrode current collector 5$a$. The negative electrode active material, the conductive agent, the binder, a mixing ratio thereof, and the negative electrode current collector may be the same as those described in the first embodiment.

Figure 4:
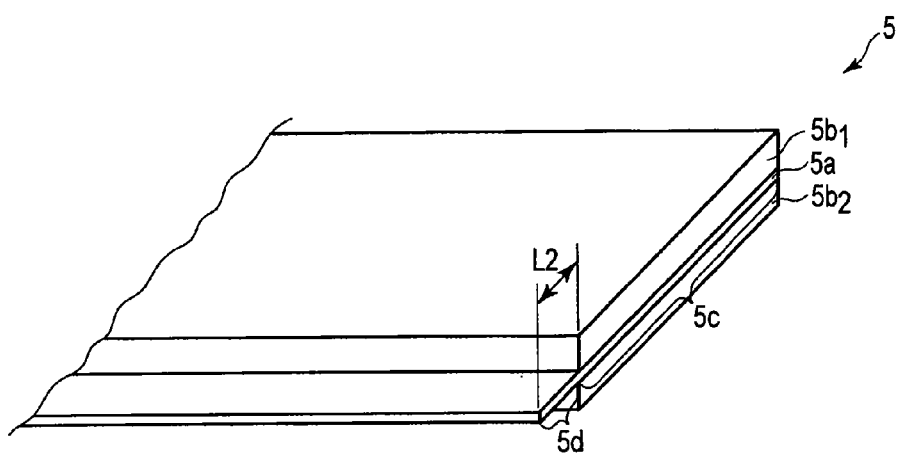
FIG. 4 is a perspective view showing a part of a negative electrode.

FIG. 4 is a perspective view showing one example of the negative electrode. Shown in FIG. 4 is a part of the negative electrode 5 in which the negative electrode active material layer 5$b$ is provided on each of both surfaces of the negative electrode current collector 5$a$. One of the surfaces of the negative electrode current collector 5$a$ which is opposed to the positive electrode is referred to as second surface. A first negative electrode active material layer $5b_1$ is provided on a part of the second surface. A second negative electrode active material layer $5b_2$ is provided on a part of a surface reverse to the second surface of the negative electrode current collector 5$a$.

The negative electrode current collector 5$a$ includes a second coated portion 5$c$ on which the first negative electrode active material layer $5b_1$ is provided and a second noncoated portion 5$d$ which is adjacent to the second coated portion 5$c$ in a direction parallel to the second surface, in which the first negative electrode active material layer $5b_1$ is not present.

The second noncoated portion 5$d$ is adjacent to at least one edge of the negative electrode current collector 5$a$ and extends along the at least one edge. The second noncoated portion 5$d$ functions as a negative electrode tab. The negative electrode terminal 8 shown in FIG. 1 is connected to the second noncoated portion 5$d$ directly or via a conduction member such as a lead. Thus, the negative electrode 5 and the negative electrode terminal 8 are electrically connected to each other.

In the present embodiment, a length from a boundary between the second coated portion 5$c$ and the second noncoated portion 5$d$ to the edge to which the second noncoated portion 5$d$ is adjacent is referred to as L2. L2 is within a range of 5 mm to 20 mm. When L2 is within the above range, it is possible to increase a contact area for the second noncoated portion 5$d$ with the negative electrode terminal 8 or the conduction member. Thus, it is possible to reduce a contact resistance between them. Further, it is possible to prevent a reduction of energy density. A minimum value of the length from the boundary between the second coated portion 5$c$ and the second noncoated portion 5$d$ to the edge of the negative electrode current collector is 5 mm or more, and a maximum value of the length is 20 mm or less.

Further, in the present embodiment, a density of the first negative electrode active material layer $5b_1$ is within a range of 2.1 g/cc to 2.4 g/cc. When the density of the first negative electrode active material layer $5b_1$ is within the above range, it is possible to improve physical contact for the negative electrode current collector 5$a$ with the negative electrode active material. As a result, it is possible to reduce the internal resistance. A density of the second negative electrode active material layer $5b_2$ is preferably within the above range.

As used herein, the term "density" means a value calculated from a volume and a mass, in which the volume is calculated by measuring a thickness and an area of the positive electrode active material layer. More specifically, the term "density" means a so-called bulk density which is a density in the case where pores including both of apertures communicated with an ambient air and apertures which are not communicated with the ambient air and are independent from one another in the negative electrode active material layer are counted into the calculation.

A ratio W1/W2 of a mass of the second coated portion 5$c$ per unit area (W1) to a mass of the second noncoated portion 5$d$ per unit area (W2) is from 0.997 to 1. The mass ratio W1/W2 is obtained by measuring a mass per unit area (for example, g/cm$^2$) of each of the second coated portion 5$c$ and the second noncoated portion 5$d$ and calculating from the results.

The second negative electrode active material layer $5b_2$ is preferably provided only on the second coated portion. More specifically, the first negative electrode active material layer $5b_1$ and the second negative electrode active material layer $5b_2$ are preferably provided at positions where they are opposed to each other with the negative electrode current collector 4a being sandwiched therebetween.

When the mass ratio (W1/W2) is within the above range, it is possible to diminish a difference in mass per unit area between the second coated portion 5c and the second noncoated portion 5d. Accordingly, it is possible to diminish skewness of the electrode. When the skewness of the electrode is small, a gap is hardly or never formed between the electrodes in winding or stacking the electrodes. As a result, it is possible to reduce the electric resistance inside the battery. Thus, it is possible to provide the negative electrode having small internal resistance.

It is possible to provide the nonaqueous electrolyte battery which is excellent in large current property by using the negative electrode having the above-described configuration.

Hereinafter, a negative electrode production method will be described.

To start with, a slurry is prepared by suspending the negative electrode active material, the conductive agent, and the binder into a solvent. As the solvent, N-methylethyl pyrrolidone may be used, for example. A mixing ratio of a total mass of the negative electrode active material, the conductive agent, and the binder to a mass of the solvent may preferably be within a range of 50:50 to 80:20.

Next, a negative electrode active material layer is formed by coating the slurry on one or both of surfaces of the negative electrode current collector, followed by drying. The slurry is coated on the negative electrode current collector except for the second noncoated portions which are successively aligned at a constant width. The second noncoated portion may preferably be adjacent to an edge which is along a longitudinal direction of the negative electrode current collector. Alternatively, two second noncoated portions may be provided in such a manner that the second noncoated portions respectively are adjacent to both edges which are along the longitudinal direction of the negative electrode current collector. A length of the second noncoated portion is adjusted to be within a range of 5 mm to 20 mm. The length of the second noncoated portion means a length from a boundary between the second coated portion and the second noncoated portion to the edge of the negative electrode current collector to which the second noncoated portion is adjacent. If the negative electrode is used for a wound electrode group, the length means a length which is in a direction perpendicular to the longitudinal direction.

Next, the negative electrode current collector on which the negative electrode active material layer is formed is rolled in such a manner that a density of the negative electrode active material layer is within a range of 2.1 g/cc to 2.4 g/cc. The rolling may be performed by using a roller press machine.

In the rolling step, the negative electrode current collector is rolled together with the negative electrode active material layer. However, since a diameter of the roller is constant, the roller does not contact the second noncoated portion on which the active material layer is not coated. Therefore, the coated portion on which the active material layer is coated is rolled to reduce the mass per unit area (W1), while the second noncoated portion is not rolled to keep the mass per unit area (W2) unchanged. As a result, the mass of the second coated portion per unit area (W1) is smaller than the mass of the second noncoated portion per unit area (W2). More specifically, the mass ratio (W1/W2) is less than 1.0, for example, about 0.995. It is difficult to make the mass ratio (W1/W2) to be 0.997 or more even if the rolling is performed by using a roller having a diameter exceeding 400 mm, for example.

In the case where the mass ratio (W1/W2) is less than 0.997, a stress is generated on a boundary between the second coated portion and the second noncoated portion to cause skewness of the entire electrode. The skewed electrode entails a gap between electrodes when the electrodes are wound or cut and stacked, thereby increasing a gap between electrode plates of the negative electrode and the negative electrode. As a result, an electric resistance inside the battery is increased, thus, a large current property is deteriorated.

However, according to the present embodiment, it is possible to make the mass ratio (W1/W2) to be 0.997 or more by reducing the mass per unit area (W2) by drawing the second noncoated portion. The drawing of the second noncoated portion is realized by performing tension processing on the entire negative electrode. In the tension processing, tension is applied to the entire negative electrode in a direction parallel to the boundary between the second coated portion and the second noncoated portion. As described in relation to the positive electrode production method of the first embodiment, the tension processing enables to selectively draw the second noncoated portion.

It is possible to perform the tension processing in the same manner as in the tension processing in the positive electrode production method of the first embodiment.

According to the above-described embodiment, it is possible to provide the nonaqueous electrolyte battery which has a more excellent large current property since both of the positive electrode and the negative electrode have a small electric resistance.

EXAMPLES

Hereinafter, the foregoing embodiments will be described in more details based on examples, but it should be understood that the present invention is not limited to the examples described below without deviating from the spirit of the present invention.

Comparative Example 1

Production of the Positive Electrode $LiCoO_2$ was used as a positive electrode active material; acetylene black and carbon black were used as conductive agents; and polyvinylidene fluoride was used as a binder. The components were mixed at a mass ratio of 85:5:5:5, and a slurry was obtained by dispersing the mixture into an organic solvent. The slurry was coated on an aluminum foil having a thickness of 20 μm, followed by drying, thereby forming an active material layer. Likewise, an active material layer was formed on a reverse surface of the aluminum foil by coating the slurry, followed by drying. The active material layers on the both surfaces of the aluminum foil were formed in such a manner that sides thereof in a longitudinal direction were aligned. More specifically, a misalignment between the sides was kept within 0.5 mm.

The aluminum foil having the active material layers on both surfaces and obtained as described above was cut at a constant width to obtain a non-rolled positive electrode in which a noncoated portion having a width of 15 mm was present on one end in the longitudinal direction. The non-rolled positive electrode was rolled by using a roller press machine to obtain a positive electrode. In the rolling, a load of the roller press machine was adjusted to attain an active material layer density of 3.2 g/cc.

<Production of the Negative Electrode>

$Li_4Ti_5O_{12}$ was used as a negative electrode active material; carbon black was used as conductive agents; and polyvinylidene fluoride was used as a binder. The components were mixed at a mass ratio of 85:10:5, and a slurry was obtained by dispersing the mixture into an organic solvent. The slurry was coated on an aluminum foil having a thickness of 20 µm, followed by drying, thereby forming an active material layer. Likewise, an active material layer was formed on a reverse surface of the aluminum foil by coating the slurry, followed by drying. The active material layers on the both surfaces of the aluminum foil were formed in such a manner that sides thereof in a longitudinal direction were aligned. More specifically, a misalignment between the sides was kept within 0.5 mm.

The aluminum foil having the active material layers on both surfaces and obtained as described above was cut at a constant width to obtain a non-rolled negative electrode in which a noncoated portion having a width of 15 mm was present on one end in the longitudinal direction. The non-rolled negative electrode was rolled by using a roller press machine to obtain a negative electrode. In the rolling, a load of the roller press machine was adjusted to attain an active material layer density of 2.2 g/cc.

<Production of the Nonaqueous Electrolyte Secondary Battery>

An electrode group was obtained by laminating the positive electrode and the negative electrode which were produced as described above with a separator being sandwiched therebetween, followed by winding in the form of a coil. The noncoated portions of the positive electrodes were projected from one end of the electrode group, and the noncoated portions of the negative electrodes were projected from the other end of the electrode group. The noncoated portions of the positive electrode were bundled, and a positive electrode terminal was bonded by ultrasonic welding. Likewise, the noncoated portions of the negative electrodes were bundled, and a negative electrode terminal was bonded by ultrasonic welding. An aluminum plate was used for each of the positive and negative electrode terminals.

The electrode group was placed in a container made from an aluminum laminate, and a nonaqueous electrolyte was injected, followed by tightly sealing, thereby obtaining a nonaqueous electrolyte secondary battery.

<Mass Ratio (W1/W2) Measurement>

From a positive electrode which was produced in the same manner as the positive electrode used for the above-described nonaqueous electrolyte secondary battery production, a coated portion was cut out. The active material on a surface of the coated portion was removed by using an organic solvent. A mass and an area of the remaining aluminum foil were measured to calculate a mass W1 per unit area. Further, a noncoated portion was cut out, and a mass and an area thereof were measured to calculate a mass W2 per unit area. A mass ratio (W1/W2) of the positive electrode current collector was 0.995.

From a negative electrode which was produced in the same manner as the negative electrode used for the above-described nonaqueous electrolyte secondary battery production, a coated portion was cut out. The active material on a surface of the coated portion was removed by using an organic solvent. A mass and an area of the remaining aluminum foil were measured to calculate a mass W1 per unit area. Further, a noncoated portion was cut out, and a mass and an area thereof were measured to calculate a mass W2 per unit area. A mass ratio (W1/W2) of the negative electrode current collector was 0.995.

<Discharge Test>

A discharge test was conducted by using the nonaqueous electrolyte secondary battery produced as described above.

The battery was charged to a half of a capacity of a full charge. After that, discharge was conducted at a current of 20 C, and a product of a voltage of 10 seconds after the start of the discharge and the discharge current was obtained to calculate an output.

Example 1

After producing a positive electrode in the same manner as in Comparative Example 1, tension processing was performed. More specifically, the positive electrode was rewound at tension of 500 N/m through an electrode rewinder provided with a withdrawing device and a winding device.

A negative electrode and a nonaqueous electrolyte secondary battery were produced in the same manner as in Comparative Example 1. The measurement and the discharge test were conducted by using the battery. A density of the active material layer, a mass ratio (W1/W2) of the current collector, and a length of the noncoated portion of each of the positive electrode and the negative electrode are shown in Table 1.

Example 2

After producing a negative electrode in the same manner as in Comparative Example 1, tension processing was performed. More specifically, the negative electrode was rewound at tension of 500 N/m through an electrode rewinder provided with a withdrawing device and a winding device.

A positive electrode and a nonaqueous electrolyte secondary battery were produced in the same manner as in Comparative Example 1. The measurement and the discharge test were conducted by using the battery. A density of the active material layer, a mass ratio (W1/W2) of the current collector, and a length of the noncoated portion of each of the positive electrode and the negative electrode are shown in Table 1.

Example 3

A nonaqueous electrolyte secondary battery was produced in the same manner as in Comparative Example 1 except for using a positive electrode produced in the same manner as in Example 1 and a negative electrode produced in the same manner as in Example 2. The measurement and the discharge test were conducted by using the battery. A density of the active material layer, a mass ratio (W1/W2) of the current collector, and a length of the noncoated portion of each of the positive electrode and the negative electrode are shown in Table 1.

Comparative Example 2

A nonaqueous electrolyte secondary battery was produced in the same manner as in Comparative Example 1 except for changing the length of each of the noncoated portions of the positive electrode and the negative electrode to 10 mm. The measurement and the discharge test were conducted by using the battery. A density of the active material layer, a mass ratio (W1/W2) of the current collector, and a length of the noncoated portion of each of the positive electrode and the negative electrode are shown in Table 1.

Example 4

A nonaqueous electrolyte secondary battery was produced in the same manner as in Comparative Example 1 except for subjecting the positive electrode of Comparative Example 2 to tension processing. The measurement and the discharge test were conducted by using the battery. A density of the active material layer, a mass ratio (W1/W2) of the current collector, and a length of the noncoated portion of each of the positive electrode and the negative electrode are shown in Table 1. The tension processing was performed in the manner described in Example 1.

Example 5

A nonaqueous electrolyte secondary battery was produced in the same manner as in Comparative Example 1 except for subjecting the negative electrode of Comparative Example 2 to tension processing. The measurement and the discharge test were conducted by using the battery. A density of the active material layer, a mass ratio (W1/W2) of the current collector, and a length of the noncoated portion of each of the positive electrode and the negative electrode are shown in Table 1. The tension processing was performed in the manner described in Example 1.

Example 6

A nonaqueous electrolyte secondary battery was produced in the same manner as in Comparative Example 1 except for subjecting each of the positive electrode and the negative electrode of Comparative Example 2 to tension processing. The measurement and the discharge test were conducted by using the battery. A density of the active material layer, a mass ratio (W1/W2) of the current collector, and a length of the noncoated portion of each of the positive electrode and the negative electrode are shown in Table 1. The tension processing was performed in the manner described in Example 1. The tension processing was performed in the manner described in Example 1.

Comparative Example 3

A nonaqueous electrolyte secondary battery was produced in the same manner as in Comparative Example 1 except for changing the length of each of the noncoated portions of the positive electrode and the negative electrode to 5 mm. The measurement and the discharge test were conducted by using the battery. A density of the active material layer, a mass ratio (W1/W2) of the current collector, and a length of the noncoated portion of each of the positive electrode and the negative electrode are shown in Table 1.

Example 7

A nonaqueous electrolyte secondary battery was produced in the same manner as in Comparative Example 1 except for subjecting the positive electrode of Comparative Example 3 to tension processing. The measurement and the discharge test were conducted by using the battery. A density of the active material layer, a mass ratio (W1/W2) of the current collector, and a length of the noncoated portion of each of the positive electrode and the negative electrode are shown in Table 1. The tension processing was performed in the manner described in Example 1.

Example 8

A nonaqueous electrolyte secondary battery was produced in the same manner as in Comparative Example 1 except for subjecting the negative electrode of Comparative Example 3 to tension processing. The measurement and the discharge test were conducted by using the battery. A density of the active material layer, a mass ratio (W1/W2) of the current collector, and a length of the noncoated portion of each of the positive electrode and the negative electrode are shown in Table 1. The tension processing was performed in the manner described in Example 1.

Example 9

A nonaqueous electrolyte secondary battery was produced in the same manner as in Comparative Example 1 except for subjecting each of the positive electrode and the negative electrode of Comparative Example 3 to tension processing. The measurement and the discharge test were conducted by using the battery. A density of the active material layer, a mass ratio (W1/W2) of the current collector, and a length of the noncoated portion of each of the positive electrode and the negative electrode are shown in Table 1. The tension processing was performed in the manner described in Example 1.

Comparative Example 4

A nonaqueous electrolyte secondary battery was produced in the same manner as in Comparative Example 1 except for changing the length of each of the noncoated portions of the positive electrode and the negative electrode to 2 mm. The measurement and the discharge test were conducted by using the battery. A density of the active material layer, a mass ratio (W1/W2) of the current collector, and a length of the noncoated portion of each of the positive electrode and the negative electrode are shown in Table 2.

Comparative Example 5

A nonaqueous electrolyte secondary battery was produced in the same manner as in Comparative Example 1 except for subjecting the positive electrode of Comparative Example 4 to tension processing. The measurement and the discharge test were conducted by using the battery. A density of the active material layer, a mass ratio (W1/W2) of the current collector, and a length of the noncoated portion of each of the positive electrode and the negative electrode are shown in Table 2. The tension processing was performed in the manner described in Example 1.

Comparative Example 6

A nonaqueous electrolyte secondary battery was produced in the same manner as in Comparative Example 1 except for subjecting the negative electrode of Comparative Example 4 to tension processing. The measurement and the discharge test were conducted by using the battery. A density of the active material layer, a mass ratio (W1/W2) of the current collector, and a length of the noncoated portion of each of the positive electrode and the negative electrode are shown in Table 2. The tension processing was performed in the manner described in Example 1.

Comparative Example 7

A nonaqueous electrolyte secondary battery was produced in the same manner as in Comparative Example 1 except for subjecting each of the positive electrode and the negative electrode of Comparative Example 4 to tension processing. The measurement and the discharge test were conducted by using the battery. A density of the active material layer, a mass ratio (W1/W2) of the current collector, and a length of the noncoated portion of each of the positive electrode and the negative electrode are shown in Table 2. The tension processing was performed in the manner described in Example 1.

Comparative Example 8

A nonaqueous electrolyte secondary battery was produced in the same manner as in Comparative Example 1 except for changing the density of the active material layer of each of the positive electrode and the negative electrode by changing the load of the roller press machine. The measurement and the discharge test were conducted by using the battery. A density of the active material layer, a mass ratio (W1/W2) of the current collector, and a length of the noncoated portion of each of the positive electrode and the negative electrode are shown in Table 2.

Example 10

A nonaqueous electrolyte secondary battery was produced in the same manner as in Comparative Example 1 except for subjecting the positive electrode of Comparative Example 8 to tension processing. The measurement and the discharge test were conducted by using the battery. A density of the active material layer, a mass ratio (W1/W2) of the current collector, and a length of the noncoated portion of each of the positive electrode and the negative electrode are shown in Table 2. The tension processing was performed in the manner described in Example 1.

Example 11

A nonaqueous electrolyte secondary battery was produced in the same manner as in Comparative Example 1 except for subjecting the negative electrode of Comparative Example 8 to tension processing. The measurement and the discharge test were conducted by using the battery. A density of the active material layer, a mass ratio (W1/W2) of the current collector, and a length of the noncoated portion of each of the positive electrode and the negative electrode are shown in Table 2. The tension processing was performed in the manner described in Example 1.

Example 12

A nonaqueous electrolyte secondary battery was produced in the same manner as in Comparative Example 1 except for subjecting each of the positive electrode and the negative electrode of Comparative Example 8 to tension processing. The measurement and the discharge test were conducted by using the battery. A density of the active material layer, a mass ratio (W1/W2) of the current collector, and a length of the noncoated portion of each of the positive electrode and the negative electrode are shown in Table 2. The tension processing was performed in the manner described in Example 1.

Comparative Example 9

A nonaqueous electrolyte secondary battery was produced in the same manner as in Comparative Example 1 except for changing the density of the active material layer of each of the positive electrode and the negative electrode by changing the load of the roller press machine. The measurement and the discharge test were conducted by using the battery. A density of the active material layer, a mass ratio (W1/W2) of the current collector, and a length of the noncoated portion of each of the positive electrode and the negative electrode are shown in Table 2.

Comparative Example 10

A nonaqueous electrolyte secondary battery was produced in the same manner as in Comparative Example 1 except for subjecting the positive electrode of Comparative Example 9 to tension processing. The measurement and the discharge test were conducted by using the battery. A density of the active material layer, a mass ratio (W1/W2) of the current collector, and a length of the noncoated portion of each of the positive electrode and the negative electrode are shown in Table 2. The tension processing was performed in the manner described in Example 1.

Comparative Example 11

A nonaqueous electrolyte secondary battery was produced in the same manner as in Comparative Example 1 except for subjecting the negative electrode of Comparative Example 9 to tension processing. The measurement and the discharge test were conducted by using the battery. A density of the active material layer, a mass ratio (W1/W2) of the current collector, and a length of the noncoated portion of each of the positive electrode and the negative electrode are shown in Table 2. The tension processing was performed in the manner described in Example 1.

Comparative Example 12

A nonaqueous electrolyte secondary battery was produced in the same manner as in Comparative Example 1 except for subjecting each of the positive electrode and the negative electrode of Comparative Example 9 to tension processing. The measurement and the discharge test were conducted by using the battery. A density of the active material layer, a mass ratio (W1/W2) of the current collector, and a length of the noncoated portion of each of the positive electrode and the negative electrode are shown in Table 2. The tension processing was performed in the manner described in Example 1.

Comparative Example 13

A nonaqueous electrolyte secondary battery was produced in the same manner as in Comparative Example 1 except for changing the density of the active material layer of each of the positive electrode and the negative electrode by changing the load of the roller press machine. The measurement and the discharge test were conducted by using the battery. A density of the active material layer, a mass ratio (W1/W2) of the current collector, and a length of the noncoated portion of each of the positive electrode and the negative electrode are shown in Table 3.

Example 13

A nonaqueous electrolyte secondary battery was produced in the same manner as in Comparative Example 1 except for subjecting the positive electrode of Comparative Example 13 to tension processing. The measurement and the discharge test were conducted by using the battery. A density of the active material layer, a mass ratio (W1/W2) of the current collector, and a length of the noncoated portion of each of the positive electrode and the negative electrode are shown in Table 3. The tension processing was performed in the manner described in Example 1.

Example 14

A nonaqueous electrolyte secondary battery was produced in the same manner as in Comparative Example 1 except for subjecting the negative electrode of Comparative Example 13 to tension processing. The measurement and the discharge test were conducted by using the battery. A density of the active material layer, a mass ratio (W1/W2) of the current collector, and a length of the noncoated portion of each of the positive electrode and the negative electrode are shown in Table 3. The tension processing was performed in the manner described in Example 1.

Example 15

A nonaqueous electrolyte secondary battery was produced in the same manner as in Comparative Example 1 except for subjecting each of the positive electrode and the negative electrode of Comparative Example 13 to tension processing. The measurement and the discharge test were conducted by using the battery. A density of the active material layer, a mass ratio (W1/W2) of the current collector, and a length of the noncoated portion of each of the positive electrode and the negative electrode are shown in Table 3. The tension processing was performed in the manner described in Example 1.

Comparative Example 14

A nonaqueous electrolyte secondary battery was produced in the same manner as in Comparative Example 1 except for changing the density of the active material layer of each of the positive electrode and the negative electrode by changing the load of the roller press machine. The measurement and the discharge test were conducted by using the battery. A density of the active material layer, a mass ratio (W1/W2) of the current collector, and a length of the noncoated portion of each of the positive electrode and the negative electrode are shown in Table 3.

Comparative Example 15

A nonaqueous electrolyte secondary battery was produced in the same manner as in Comparative Example 1 except for using $LiNi_{0.8}Co_{0.17}Al_{0.03}O_2$ as the positive electrode active material. The measurement and the discharge test were conducted by using the battery. A density of the active material layer, a mass ratio (W1/W2) of the current collector, and a length of the noncoated portion of each of the positive electrode and the negative electrode are shown in Table 3.

Example 16

A nonaqueous electrolyte secondary battery was produced in the same manner as in Comparative Example 1 except for subjecting the positive electrode of Comparative Example 15 to tension processing. The measurement and the discharge test were conducted by using the battery. A density of the active material layer, a mass ratio (W1/W2) of the current collector, and a length of the noncoated portion of each of the positive electrode and the negative electrode are shown in Table 3. The tension processing was performed in the manner described in Example 1.

Example 17

A nonaqueous electrolyte secondary battery was produced in the same manner as in Comparative Example 1 except for subjecting the negative electrode of Comparative Example 15 to tension processing. The measurement and the discharge test were conducted by using the battery. A density of the active material layer, a mass ratio (W1/W2) of the current collector, and a length of the noncoated portion of each of the positive electrode and the negative electrode are shown in Table 3. The tension processing was performed in the manner described in Example 1.

Example 18

A nonaqueous electrolyte secondary battery was produced in the same manner as in Comparative Example 1 except for subjecting each of the positive electrode and the negative electrode of Comparative Example 15 to tension processing. The measurement and the discharge test were conducted by using the battery. A density of the active material layer, a mass ratio (W1/W2) of the current collector, and a length of the noncoated portion of each of the positive electrode and the negative electrode are shown in Table 3. The tension processing was performed in the manner described in Example 1.

Comparative Example 16

A nonaqueous electrolyte secondary battery was produced in the same manner as in Comparative Example 1 except for using $Li_{1.1}Mn_{1.8}Al_{0.1}O_4$ as the positive electrode active material. The measurement and the discharge test were conducted by using the battery. A density of the active material layer, a mass ratio (W1/W2) of the current collector, and a length of the noncoated portion of each of the positive electrode and the negative electrode are shown in Table 3.

Example 19

A nonaqueous electrolyte secondary battery was produced in the same manner as in Comparative Example 1 except for subjecting the positive electrode of Comparative Example 16 to tension processing. The measurement and the discharge test were conducted by using the battery. A density of the active material layer, a mass ratio (W1/W2) of the current collector, and a length of the noncoated portion of each of the positive electrode and the negative electrode are shown in Table 3. The tension processing was performed in the manner described in Example 1.

Example 20

A nonaqueous electrolyte secondary battery was produced in the same manner as in Comparative Example 1 except for subjecting the negative electrode of Comparative Example 16 to tension processing. The measurement and the discharge test were conducted by using the battery. A density of the active material layer, a mass ratio (W1/W2) of the current collector, and a length of the noncoated portion of each of the positive electrode and the negative electrode are shown in Table 3. The tension processing was performed in the manner described in Example 1.

Example 21

A nonaqueous electrolyte secondary battery was produced in the same manner as in Comparative Example 1 except for subjecting each of the positive electrode and the negative electrode of Comparative Example 16 to tension processing. The measurement and the discharge test were conducted by using the battery. A density of the active material layer, a mass ratio (W1/W2) of the current collector, and a length of the noncoated portion of each of the positive electrode and the negative electrode are shown in Table 3. The tension processing was performed in the manner described in Example 1.
<Results>
A ratio of the output of each of Examples and Comparative Examples to the output of Comparative Example 1 was calculated. The results are shown in Tables 1-3.

TABLE 1

| | Positive electrode | | | | Negative electrode | | | | |
|---|---|---|---|---|---|---|---|---|---|
| | Positive electrode active material | Density (g/cc) | W1/W2 | Noncoated portion length (mm) | Negative electrode active material | Density (g/cc) | W1/W2 | Noncoated portion length (mm) | Output ratio |
| Comparative Example 1 | $LiCoO_2$ | 3.2 | 0.995 | 15 | $Li_4Ti_5O_{12}$ | 2.2 | 0.995 | 15 | 1 |
| Example 1 | $LiCoO_2$ | 3.2 | 0.997 | 15 | $Li_4Ti_5O_{12}$ | 2.2 | 0.995 | 15 | 1.1 |
| Example 2 | $LiCoO_2$ | 3.2 | 0.995 | 15 | $Li_4Ti_5O_{12}$ | 2.2 | 0.997 | 15 | 1.1 |
| Example 3 | $LiCoO_2$ | 3.2 | 0.997 | 15 | $Li_4Ti_5O_{12}$ | 2.2 | 0.997 | 15 | 1.2 |
| Comparative Example 2 | $LiCoO_2$ | 3.2 | 0.995 | 10 | $Li_4Ti_5O_{12}$ | 2.2 | 0.995 | 10 | 0.9 |
| Example 4 | $LiCoO_2$ | 3.2 | 0.998 | 10 | $Li_4Ti_5O_{12}$ | 2.2 | 0.995 | 10 | 1.05 |
| Example 5 | $LiCoO_2$ | 3.2 | 0.995 | 10 | $Li_4Ti_5O_{12}$ | 2.2 | 0.997 | 10 | 1.0 |
| Example 6 | $LiCoO_2$ | 3.2 | 0.998 | 10 | $Li_4Ti_5O_{12}$ | 2.2 | 0.997 | 10 | 1.1 |
| Comparative Example 3 | $LiCoO_2$ | 3.2 | 0.995 | 5 | $Li_4Ti_5O_{12}$ | 2.2 | 0.995 | 5 | 0.7 |
| Example 7 | $LiCoO_2$ | 3.2 | 0.998 | 5 | $Li_4Ti_5O_{12}$ | 2.2 | 0.995 | 5 | 0.75 |
| Example 8 | $LiCoO_2$ | 3.2 | 0.995 | 5 | $Li_4Ti_5O_{12}$ | 2.2 | 0.997 | 5 | 0.75 |
| Example 9 | $LiCoO_2$ | 3.2 | 0.998 | 5 | $Li_4Ti_5O_{12}$ | 2.2 | 0.997 | 5 | 0.8 |

TABLE 2

| | Positive electrode | | | | Negative electrode | | | | |
|---|---|---|---|---|---|---|---|---|---|
| | Positive electrode active material | Density (g/cc) | W1/W2 | Noncoated portion length (mm) | Negative electrode active material | Density (g/cc) | W1/W2 | Noncoated portion length (mm) | Output ratio |
| Comparative Example 4 | $LiCoO_2$ | 3.2 | 0.995 | 2 | $Li_4Ti_5O_{12}$ | 2.2 | 0.995 | 2 | 0.2 |
| Comparative Example 5 | $LiCoO_2$ | 3.2 | 0.998 | 2 | $Li_4Ti_5O_{12}$ | 2.2 | 0.995 | 2 | 0.2 |
| Comparative Example 6 | $LiCoO_2$ | 3.2 | 0.995 | 2 | $Li_4Ti_5O_{12}$ | 2.2 | 0.997 | 2 | 0.2 |
| Comparative Example 7 | $LiCoO_2$ | 3.2 | 0.998 | 2 | $Li_4Ti_5O_{12}$ | 2.2 | 0.997 | 2 | 0.2 |
| Comparative Example 8 | $LiCoO_2$ | 3.1 | 0.995 | 15 | $Li_4Ti_5O_{12}$ | 2.1 | 0.995 | 15 | 1 |
| Example 10 | $LiCoO_2$ | 3.1 | 0.997 | 15 | $Li_4Ti_5O_{12}$ | 2.1 | 0.995 | 15 | 1.1 |
| Example 11 | $LiCoO_2$ | 3.1 | 0.995 | 15 | $Li_4Ti_5O_{12}$ | 2.1 | 0.997 | 15 | 1.1 |
| Example 12 | $LiCoO_2$ | 3.1 | 0.997 | 15 | $Li_4Ti_5O_{12}$ | 2.1 | 0.997 | 15 | 1.2 |
| Comparative Example 9 | $LiCoO_2$ | 3.0 | 0.996 | 15 | $Li_4Ti_5O_{12}$ | 2.0 | 0.996 | 15 | 0.5 |
| Comparative Example 10 | $LiCoO_2$ | 3.0 | 0.998 | 15 | $Li_4Ti_5O_{12}$ | 2.0 | 0.996 | 15 | 0.5 |
| Comparative Example 11 | $LiCoO_2$ | 3.0 | 0.996 | 15 | $Li_4Ti_5O_{12}$ | 2.0 | 0.997 | 15 | 0.5 |
| Comparative Example 12 | $LiCoO_2$ | 3.0 | 0.998 | 15 | $Li_4Ti_5O_{12}$ | 2.0 | 0.997 | 15 | 0.5 |

TABLE 3

| | Positive electrode | | | | Negative electrode | | | | |
|---|---|---|---|---|---|---|---|---|---|
| | Positive electrode active material | Density (g/cc) | W1/W2 | Noncoated portion length (mm) | Negative electrode active material | Density (g/cc) | W1/W2 | Noncoated portion length (mm) | Output ratio |
| Comparative Example 13 | $LiCoO_2$ | 3.4 | 0.994 | 15 | $Li_4Ti_5O_{12}$ | 2.4 | 0.993 | 15 | 0.95 |
| Example 13 | $LiCoO_2$ | 3.4 | 0.997 | 15 | $Li_4Ti_5O_{12}$ | 2.4 | 0.993 | 15 | 1.0 |
| Example 14 | $LiCoO_2$ | 3.4 | 0.994 | 15 | $Li_4Ti_5O_{12}$ | 2.4 | 0.998 | 15 | 1.05 |
| Example 15 | $LiCoO_2$ | 3.4 | 0.997 | 15 | $Li_4Ti_5O_{12}$ | 2.4 | 0.998 | 15 | 1.2 |
| Comparative Example 14 | $LiCoO_2$ | 3.5 | 0.997 | 15 | $Li_4Ti_5O_{12}$ | 2.5 | 0.998 | 15 | 0.9 |
| Comparative Example 15 | $LiNi_{0.8}Co_{0.17}Al_{0.03}O_2$ | 3.1 | 0.994 | 15 | $Li_4Ti_5O_{12}$ | 2.2 | 0.995 | 15 | 1 |
| Example 16 | $LiNi_{0.8}Co_{0.17}Al_{0.03}O_2$ | 3.1 | 0.997 | 15 | $Li_4Ti_5O_{12}$ | 2.2 | 0.995 | 15 | 1.1 |
| Example 17 | $LiNi_{0.8}Co_{0.17}Al_{0.03}O_2$ | 3.1 | 0.994 | 15 | $Li_4Ti_5O_{12}$ | 2.2 | 0.997 | 15 | 1.05 |
| Example 18 | $LiNi_{0.8}Co_{0.17}Al_{0.03}O_2$ | 3.1 | 0.997 | 15 | $Li_4Ti_5O_{12}$ | 2.2 | 0.997 | 15 | 1.2 |
| Comparative Example 16 | $Li_{1.1}Mn_{1.8}Al_{0.1}O_4$ | 3.3 | 0.995 | 15 | $Li_4Ti_5O_{12}$ | 2.2 | 0.996 | 15 | 1 |
| Example 19 | $Li_{1.1}Mn_{1.8}Al_{0.1}O_4$ | 3.3 | 0.998 | 15 | $Li_4Ti_5O_{12}$ | 2.2 | 0.996 | 15 | 1.1 |

TABLE 3-continued

| | Positive electrode | | | | Negative electrode | | | | |
|---|---|---|---|---|---|---|---|---|---|
| | Positive electrode active material | Density (g/cc) | W1/W2 | Noncoated portion length (mm) | Negative electrode active material | Density (g/cc) | W1/W2 | Noncoated portion length (mm) | Output ratio |
| Example 20 | $Li_{1.1}Mn_{1.8}Al_{0.1}O_4$ | 3.3 | 0.995 | 15 | $Li_4Ti_5O_{12}$ | 2.2 | 0.998 | 15 | 1.05 |
| Example 21 | $Li_{1.1}Mn_{1.8}Al_{0.1}O_4$ | 3.3 | 0.998 | 15 | $Li_4Ti_5O_{12}$ | 2.2 | 0.998 | 15 | 1.2 |

Example 1 in which the mass ratio (W1/W2) of the positive electrode current collector is 0.997 or more has the higher output ratio than Comparative Example 1. Example 3 in which the mass ratio (W1/W2) of each of the current collectors of the positive electrode and the negative electrode is 0.997 or more has the much higher output ratio than Example 1.

Example 4 in which the mass ratio (W1/W2) of the positive electrode current collector is 0.997 or more has the higher output ratio than Comparative Example 2. Example 6 in which the mass ratio (W1/W2) of each of the current collectors of the positive electrode and the negative electrode is 0.997 or more has the much higher output ratio than Example 4.

Example 7 in which the mass ratio (W1/W2) of the positive electrode current collector is 0.997 or more has the higher output ratio than Comparative Example 3. Example 9 in which the mass ratio (W1/W2) of each of the current collectors of the positive electrode and the negative electrode is 0.997 or more has the much higher output ratio than Example 7.

Example 10 in which the mass ratio (W1/W2) of the positive electrode current collector is 0.997 or more has the higher output ratio than Comparative Example 8. Example 12 in which the mass ratio (W1/W2) of each of the current collectors of the positive electrode and the negative electrode is 0.997 or more has the much higher output ratio than Example 10.

Example 13 in which the mass ratio (W1/W2) of the positive electrode current collector is 0.997 or more has the higher output ratio than Comparative Example 13. Example 15 in which the mass ratio (W1/W2) of each of the current collectors of the positive electrode and the negative electrode is 0.997 or more has the much higher output ratio than Example 13.

Each of Comparative Examples 4 to 7 in which the length of the noncoated portion of each of the positive electrode and the negative electrode is 2 mm has the low output ratio irrespective of the mass ratios (W1/W2) of the current collectors of the positive electrode and the negative electrode. It is considered that the output property was considerably deteriorated as a result of an increase in contact resistance caused by the insufficient contact area between the noncoated portion and the electrode terminal. Therefore, it is considered that the effects of the present invention are satisfactorily exhibited in the case where the length of the noncoated portion is 5 mm or more.

The electrode in which the length of the noncoated portion is less than 5 mm is suppressed in skewness between the coated portion and the noncoated portion in the rolling processing in the production process. Therefore, it is possible to attain the prominent effect of the tension application in the case where the length of the noncoated portion is 5 mm or more.

Each of Comparative Examples 9 to 12 in which the density of the positive electrode active material layer is 3.0 g/cc and the density of the negative electrode active material layer is 2.0 g/cc has the low output ratio irrespective of the mass ratios (W1/W2) of the current collectors of the positive electrode and the negative electrode. It is considered that the output property was deteriorated as a result of an increase in contact resistance caused by the insufficient contact between the active material and the current collector due to the low density. Therefore, it is considered that the effects of the present invention are satisfactorily exhibited in the case where the positive electrode density is 3.1 g/cc or more or the negative electrode density is 2.1 g/cc or more.

The positive electrode in which the density of the positive electrode active material layer is less than 3.1 g/cc and the negative electrode in which the density of the negative electrode active material layer is less than 2.1 g/cc are suppressed in skewness between the coated portion and the noncoated portion since they are not rolled or the rolling is insufficient in the production process. Therefore, it is possible to attain the prominent effect of the tension application in the case where the positive electrode density is 3.1 g/cc or more or the negative electrode density is 2.1 g/cc or more.

Comparative Example 14 in which the density of the positive electrode active material layer is 3.5 g/cc and the density of the negative electrode active material layer is 2.5 g/cc has the low output ratio though the mass ratio of each of the current collectors of the positive electrode and the negative electrode is 0.997 or more. It is considered that the output property was deteriorated as a result of shortage of the electrolyte amount which is caused by the reduced number of clearances in the active material layers.

Example 16 in which the mass ratio (W1/W2) of the positive electrode current collector is 0.997 or more has the higher output ratio than Comparative Example 15. Example 18 in which the mass ratio (W1/W2) of each of the positive electrode and the negative electrode is 0.997 or more has the much higher output ratio than Example 16.

Example 19 in which the mass ratio (W1/W2) of the positive electrode current collector is 0.997 or more has the higher output ratio than Comparative Example 16. Example 21 in which the mass ratio (W1/W2) of each of the current collectors of the positive electrode and the negative electrode is 0.997 or more has the much higher output ratio than Example 19.

From the above results, it is revealed that the battery having the configuration of the first embodiment has the higher output than the batteries of Comparative Examples. Therefore, it is revealed that the battery has the excellent large current property. Further, it is revealed that the battery having the configuration of the first embodiment has the much higher output than the batteries of Comparative Examples. Therefore, it is revealed that the battery has the more excellent large current property.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

1 . . . nonaqueous electrolyte battery; 2 . . . wound electrode group; 3 . . . container; 4 . . . positive electrode; 4a . . . positive electrode current collector; 4b . . . positive electrode active material layer; 4c . . . first coated portion; 4d . . . first noncoated portion; 5 . . . negative electrode; 5a . . . negative electrode current collector; 5b . . . negative electrode active material layer; 5c . . . second coated portion; 5d . . . second noncoated portion; 6 . . . separator; 7 . . . positive electrode terminal; and 8 . . . negative electrode terminal.

What is claimed is:

1. A nonaqueous electrolyte secondary battery comprising:
a positive electrode comprising a positive electrode current collector having a first surface and a first positive electrode active material layer provided on a part of the first surface;
a negative electrode comprising a negative electrode current collector having a second surface opposed to the first surface and a first negative electrode active material layer provided on a part of the second surface; and
a nonaqueous electrolyte, wherein
the positive electrode current collector comprises a first coated portion on which the first positive electrode active material layer is provided and a first noncoated portion which is adjacent to the first coated portion in a direction parallel to the first surface, in which the first positive electrode active material layer is not present;
the first noncoated portion is adjacent to at least one edge of the positive electrode current collector and extends along the at least one edge;
a length from a boundary between the first coated portion and the first noncoated portion to the at least one edge of the positive electrode current collector is within a range of 5 mm to 20 mm;
a density of the first positive electrode active material layer is within a range of 3.1 g/cc to 3.4 g/cc; and
a ratio W1/W2 of a mass of the first coated portion per unit area (W1) to a mass of the first noncoated portion per unit area (W2) is from 0.997 to 1.

2. The nonaqueous electrolyte secondary battery according to claim 1, wherein the positive electrode further comprises a second positive electrode active material layer, and the second positive electrode active material layer is opposed to the first positive elected active material layer with the positive electrode current collector being sandwiched therebetween.

3. The nonaqueous electrolyte secondary battery according to claim 2, wherein the second positive electrode active material layer is provided only on the first coated portion.

4. The nonaqueous electrolyte secondary battery according to claim 1,
wherein the negative electrode current collector comprises a second coated portion on which the first negative electrode active material layer is provided and a second noncoated portion which is adjacent to the second coated portion in a direction parallel to the second surface, in which the first negative electrode active material layer is not present, the second noncoated portion is adjacent to at least one edge of the negative electrode current collector and extends along the at least one edge;
a length from a boundary between the second coated portion and the second noncoated portion to the at least one edge of the negative electrode current collector is within a range of 5 mm to 20 mm;
a density of the first negative electrode active material layer is within a range of 2.1 g/cc to 2.4 g/cc; and
a ratio W1/W2 of a mass of the second coated portion per unit area (W1) to a mass of the second noncoated portion per unit area (W2) is from 0.997 to 1.

5. The nonaqueous electrolyte secondary battery according to claim 2,
wherein the negative electrode current collector comprises a second coated portion on which the first negative electrode active material layer is provided and a second noncoated portion which is adjacent to the second coated portion in a direction parallel to the second surface, in which the first negative electrode active material layer is not present, the second noncoated portion is adjacent to at least one edge of the negative electrode current collector and extends along the at least one edge;
a length from a boundary between the second coated portion and the second noncoated portion to the at least one edge of the negative electrode current collector is within a range of 5 mm to 20 mm;
a density of the first negative electrode active material layer is within a range of 2.1 g/cc to 2.4 g/cc; and
a ratio W1/W2 of a mass of the second coated portion per unit area (W1) to a mass of the second noncoated portion per unit area (W2) is from 0.997 to 1.

6. The nonaqueous electrolyte secondary battery according to claim 3,
wherein the negative electrode current collector comprises a second coated portion on which the first negative electrode active material layer is provided and a second noncoated portion which is adjacent to the second coated portion in a direction parallel to the second surface, in which the first negative electrode active material layer is not present, the second noncoated portion is adjacent to at least one edge of the negative electrode current collector and extends along the at least one edge;
a length from a boundary between the second coated portion and the second noncoated portion to the at least one edge of the negative electrode current collector is within a range of 5 mm to 20 mm;
a density of the first negative electrode active material layer is within a range of 2.1 g/cc to 2.4 g/cc; and
a ratio W1/W2 of a mass of the second coated portion per unit area (W1) to a mass of the second noncoated portion per unit area (W2) is from 0.997 to 1.

7. The nonaqueous electrolyte secondary battery according to claim 4, wherein the negative electrode further comprises a second negative electrode active material layer, and the second negative electrode active material layer is opposed to the first negative elected active material layer with the negative electrode current collector being sandwiched therebetween.

8. The nonaqueous electrolyte secondary battery according to claim 7, wherein the second negative electrode active material layer is provided only on the second coated portion.

9. The nonaqueous electrolyte secondary battery according to of claim 4, further comprising:
a separator comprising first and second portions which are separated from each other and a third portion which is positioned between the first and second portions, in which the third portion is positioned between the first and the second coated portions, wherein the first noncoated portion is opposed to the first portion of the separator, and the second noncoated portion is opposed to the second portion of the separator.

10. The nonaqueous electrolyte secondary battery according to claim 7, further comprising:
a separator comprising first and second portions which are separated from each other and a third portion which is positioned between the first and second portions, in which the third portion is positioned between the first and the second coated portions,
wherein the first noncoated portion is opposed to the first portion of the separator, and the second noncoated portion is opposed to the second portion of the separator.

11. The nonaqueous electrolyte secondary battery according to of claim 8, further comprising:
a separator comprising first and second portions which are separated from each other and a third portion which is positioned between the first and second portions, in which the third portion is positioned between the first and the second coated portions,
wherein the first noncoated portion is opposed to the first portion of the separator, and the second noncoated portion is opposed to the second portion of the separator.

12. The nonaqueous electrolyte secondary battery according to claim 1,
wherein the first negative electrode active material layer comprises at least one negative electrode active material selected from the group consisting of a lithium titanium oxide, $TiO_2$, and a metal composite oxide containing at least one element of P, V, Sn, Cu, Ni, Co and Fe, and Ti.

13. The nonaqueous electrolyte secondary battery according to claim 1,
wherein the first negative electrode active material layer comprises at least one negative electrode active material selected from $Li_4Ti_5O_{12}$ and $Li_2Ti_3O_7$.

* * * * *